(12) United States Patent
Olsommer

(10) Patent No.: US 10,283,786 B2
(45) Date of Patent: May 7, 2019

(54) BIPOLAR PLATE FOR A FUEL CELL

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: David Olsommer, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 316 days.

(21) Appl. No.: 14/438,352

(22) PCT Filed: Oct. 16, 2013

(86) PCT No.: PCT/EP2013/071627
§ 371 (c)(1),
(2) Date: Apr. 24, 2015

(87) PCT Pub. No.: WO2014/067781
PCT Pub. Date: May 8, 2014

(65) Prior Publication Data
US 2015/0280253 A1   Oct. 1, 2015

(30) Foreign Application Priority Data
Oct. 30, 2012   (FR) ..................... 12 60338

(51) Int. Cl.
*H01M 8/0258* (2016.01)
*H01M 8/026* (2016.01)
(Continued)

(52) U.S. Cl.
CPC ......... *H01M 8/0258* (2013.01); *H01M 8/026* (2013.01); *H01M 8/0263* (2013.01);
(Continued)

(58) Field of Classification Search
None
See application file for complete search history.

(56) References Cited

U.S. PATENT DOCUMENTS

| 6,884,536 B1* | 4/2005 | Hatoh ............... H01M 8/0247 429/433 |
| 7,122,273 B2 | 10/2006 | Chaix ........................ 429/122 |

(Continued)

FOREIGN PATENT DOCUMENTS

| DE | 10 2006 056 468 A1 | 7/2007 |
| EP | 1 358 691 A1 | 11/2003 |

(Continued)

OTHER PUBLICATIONS

Dec. 20, 2013 International Search Report and Written Opinion in International Patent Appln. No. PCT/EP2013/071627.

*Primary Examiner* — Lucas J. O'Donnell
(74) *Attorney, Agent, or Firm* — Venable LLP

(57) ABSTRACT

A bipolar plate, which forms a first polar plate of a first base element of a fuel cell and a second polar plate of a second base element adjacent to the first base element of the fuel cell, includes two parallel plates. Each plate of the parallel plates includes at least one distribution channel formed in a thickness thereof, for distributing fuel or oxidant. Each distribution channel is arranged so that, when the first and second base elements of the fuel cell are stacked together, a flow channel is formed between the two parallel plates, and the flow channel communicates with a cooling fluid supply opening.

17 Claims, 3 Drawing Sheets

(51) Int. Cl.
*H01M 8/0263* (2016.01)
*H01M 8/04007* (2016.01)
*H01M 8/0267* (2016.01)
*H01M 8/1018* (2016.01)

(52) U.S. Cl.
CPC ..... *H01M 8/0267* (2013.01); *H01M 8/04007* (2013.01); *H01M 2008/1095* (2013.01)

(56) References Cited

U.S. PATENT DOCUMENTS

| | | |
|---|---|---|
| 8,940,457 B2 | 1/2015 | Delfino et al. .............. 429/514 |
| 9,966,613 B2 | 5/2018 | Olsommer |
| 2002/0081477 A1 | 6/2002 | McLean et al. ............. 429/34 |
| 2003/0224239 A1* | 12/2003 | Carlstrom ........... H01M 8/0226 |
| | | 429/434 |
| 2004/0209150 A1* | 10/2004 | Rock ................ H01M 8/0258 |
| | | 429/434 |
| 2005/0100775 A1 | 5/2005 | Rock ........................... 429/35 |
| 2009/0325036 A1 | 12/2009 | Blank et al. ................. 429/38 |
| 2011/0212385 A1 | 9/2011 | Naoki ......................... 429/514 |
| 2015/0280254 A1 | 10/2015 | Olsommer |

FOREIGN PATENT DOCUMENTS

| | | |
|---|---|---|
| JP | 2007-226991 A | 9/2007 |
| WO | WO 02/059995 A1 | 8/2002 |

* cited by examiner

Section A-A

Section B-B

BIPOLAR PLATE FOR A FUEL CELL

TECHNICAL FIELD

The present invention relates to the field of fuel cells, and in particular that of bipolar plates used to form the stack of a fuel cell. In fact, a fuel cell is composed of a stack of electrochemical cells comprising an anode and a cathode separated by an ion-exchange membrane, the electrodes being themselves arranged between two bipolar plates.

At the present time, numerous studies are being conducted on fuel cells, in the context of efforts being made to limit environmental pollution, notably in transport systems. Electrolytic generators based on hydrogen fuel, using air or pure oxygen as the oxidant, are unquestionably some of the most widely studied types at present.

PRIOR ART

As mentioned above, a fuel cell includes a stack of basic cells, each comprising an anode, a cathode and an ion-exchange membrane acting as the electrolyte. During the operation of a fuel cell, two simultaneous electrochemical reactions take place, namely oxidation of the fuel at the anode and reduction of the oxidant at the cathode. These two reactions produce positive and negative ions, which combine at the membrane to produce electricity in the form of a potential difference. In the case of an oxygen-hydrogen fuel cell, it is the H+ and O− ions that combine.

These electrochemical reactions take place in each basic cell, each of these cells being separated from the adjacent cells by bipolar plates, which have a number of functions, notably:

a first function of supplying the cell with fuel and oxidant, and a second function of heat exchange, enabling the stack to be refrigerated or cooled.

It should be noted that a bipolar plate is generally composed of two thin plates, fixed together by a method such as welding or adhesive bonding. Additionally, bipolar plates, because of their different functions must be electrically conductive, while remaining insensitive to the oxidant and to the fuel in terms of corrosion.

To fulfil the first function, a channel is provided over the whole face of the bipolar plates in contact with the membrane. Each channel has an inlet through which the fuel or the oxidant penetrates, and an outlet through which are discharged the neutral gases, the water generated by the electrochemical reaction, and the residual moisture of the hydrogen, for its part.

To fulfil the second function, a cooling liquid is generally passed between the two thin plates forming the bipolar plate. However, it has been found that, in conventional bipolar plates, this cooling does not take place correctly, as the cooling fluid does not flow through the whole of the bipolar plate.

Patent application EP 1 358 691 discloses bipolar plates including pins fitted between the two plates forming the bipolar plate, to ensure that there is sufficient space between the two plates to allow the flow of the cooling liquid. However, this solution has a number of drawbacks, notably in terms of ease of manufacture. It has also been found that it does not provide maximal cooling, since the flow of the cooling liquid is not uniform over the whole of the plate.

BRIEF DESCRIPTION OF THE INVENTION

Accordingly, the present invention aims to propose bipolar plates having arrangements for improving the cooling of fuel cells. In another aspect, the present invention aims to propose bipolar plates having arrangements for strengthening the supply of fuel and/or oxidant.

Accordingly, the invention relates to a bipolar plate forming the first polar plate of a first base element of a fuel cell and the second polar plate of a second base element adjacent to the first base element of the same fuel cell, comprising two parallel plates, each plate having at least one channel for distributing fuel or oxidant, arranged in the thickness of the polar plate, and the bipolar plate being characterized in that the distribution channels are arranged so that, when the first and second base elements of the fuel cell are stacked together, a flow channel is formed between the two polar plates, and in that this distribution channel communicates with a cooling fluid supply opening.

In a specific embodiment, the distribution of the channels on one face of the bipolar plate is identical to the distribution of the channels on the second plate of the bipolar face, except in an area in which the channels are offset.

In a specific embodiment, the area in which the channels are offset is the area in which, during the assembly of the bipolar plate, the horizontal channels would coincide if there were no offset.

In a specific embodiment, the offset has a value of half a pitch upwards.

In a specific embodiment, the offset of the channels is created on the anode face of the bipolar plate.

In a specific embodiment, the offset channel elements have fixing points.

Another aspect of the invention relates to a bipolar plate forming the first polar plate of a first base element of a fuel cell and the second polar plate of a second base element adjacent to the first base element of the same fuel cell, comprising two parallel plates, each plate having at least one channel for distributing fuel or oxidant, formed in the thickness of the polar plate, the bipolar plate further comprising a manifold for the supply of fuel and/or oxidant, this manifold communicating with the interior of the bipolar plate through openings. The bipolar plate is characterized in that it comprises a cut-out formed in one of the parallel plates, so as to allow a gas located in the manifold to enter the distribution channel via the openings and the cut-out.

In a specific embodiment, the bipolar plate has a first sealing element, located on the outer face of the bipolar plate in which the cut-out is formed, between the manifold and the cut-out, parallel to the cut-out.

In a specific embodiment, the first sealing element is a joint made of a polymer material.

In a specific embodiment, the bipolar plate includes, between the cut-out and the supply channels, a second sealing element for providing a seal between the gas inlet openings and a cooling liquid present between the two parallel plates.

In a specific embodiment, the second sealing element is provided by a means included in the group comprising welding, brazing, and adhesive bonding.

In a specific embodiment, the cut-out and/or the first sealing element and/or the second sealing element extend over the whole length of the manifold.

BRIEF DESCRIPTION OF THE DRAWINGS

Other objects and advantages of the invention will be clearly apparent from the following description of a preferred, but non-limiting, embodiment, illustrated by the following figures, in which.

DESCRIPTION OF THE BEST EMBODIMENT OF THE INVENTION

Figure 1:
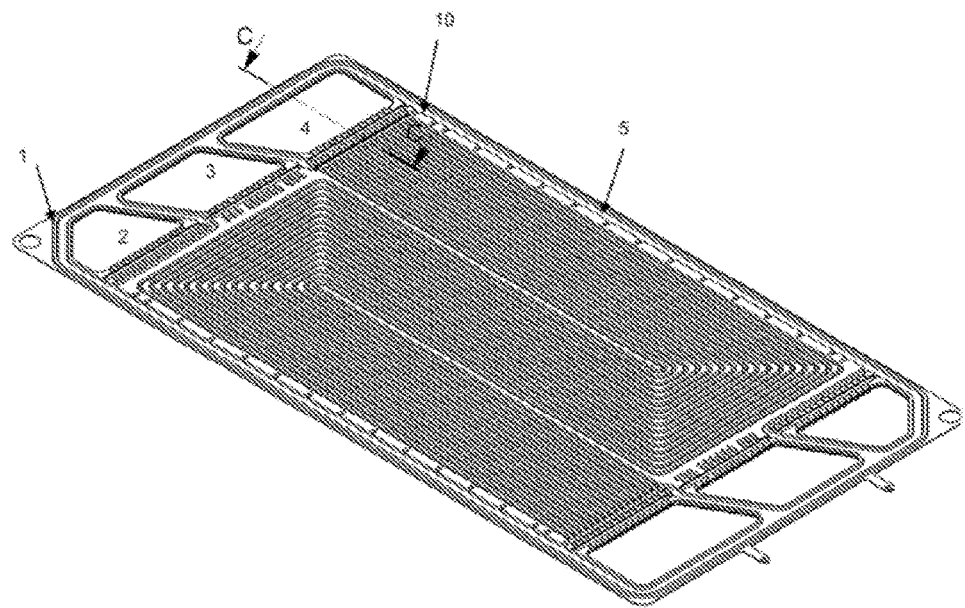
FIG. 1 shows a first face of a bipolar plate according to the invention.

A bipolar plate comprises a central skeleton 1 composed of two parallel thin plates, fixed together by a method such as adhesive bonding or welding. One face of this plate is intended to be placed against an anode, in a fuel cell, and the other face is intended to be placed against a cathode.

Various terms are used in the following text, and are to be interpreted according to their definition given below:
- the term "face of the bipolar plate" means the outer face of one of the thin plates,
- the "sides of the bipolar plate" are the four sides of the rectangle forming the bipolar plate,
- the term "horizontal" denotes an element parallel to the shorter sides of the bipolar plate, and the term "vertical" denotes an element parallel to the longer sides of the bipolar plate,
- the term "top of the bipolar plate" denotes the edge of the plate through which the gases and the cooling liquid enter,
- the term "bottom of the bipolar plate" denotes the edge of the plate through which the neutral gases and the cooling liquid are discharged,
- the term "anode bipolar face" denotes the face of the bipolar plate which is to be placed in contact with an anode during the assembly of the fuel cell, and
- the term "cathode bipolar face" denotes the face of the bipolar plate which is to be placed in contact with a cathode during the assembly of the fuel cell.

The thin plates are pierced with a plurality of holes on their periphery, so as to form manifolds for fuel 2, oxidant 4, and cooling liquid 3. The plates also include a set of channels 5, formed in their thickness, so as to allow the flow of fuel or oxidant on their surface. The thin plates also have openings 6 enabling a manifold to communicate with a gas flow channel.

The present invention provides a bipolar plate having different channel layouts on each of the two faces of the bipolar plate. This is because the aim of the present invention is to propose a bipolar plate in which the distribution of the cooling fluid is uniform. For this purpose, the present invention proposes, in an advantageous embodiment, a channel layout enabling the cooling liquid to spread between the thin plates forming the bipolar plate.

In an advantageous embodiment, a first face of the bipolar plate has a channel layout as shown in FIG. 1, formed by a rectangular spiral covering two thirds of the plate, and terminating, on the third third of the plate, in a coil of parallel lines.

Figure 3:
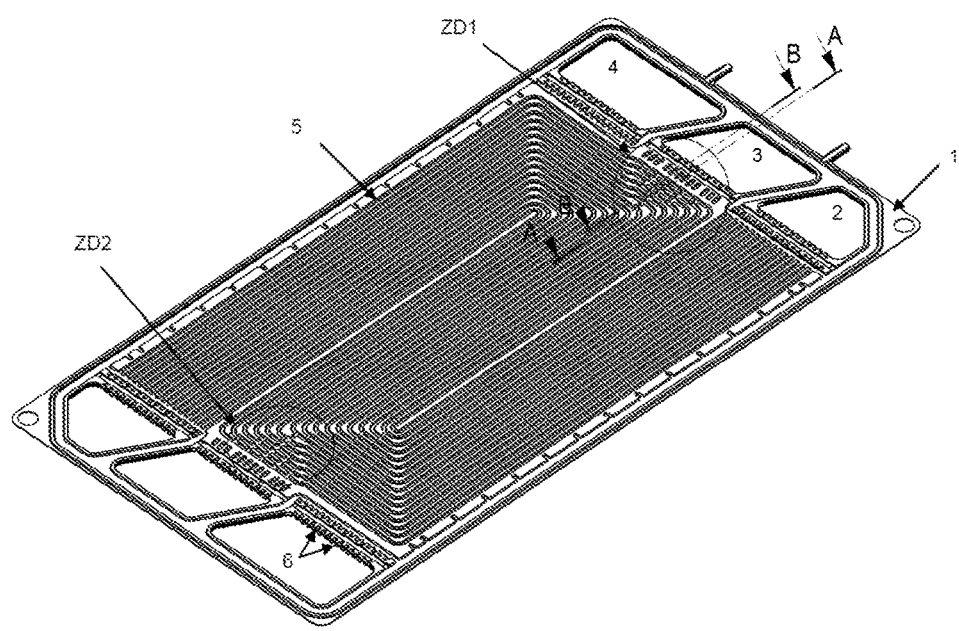
FIG. 3 shows a second face of a bipolar plate according to the invention.

In an advantageous embodiment shown in FIG. 3, the second face of the bipolar plate has a channel layout with horizontal elements of the rectangular spiral offset upwardly in the vertical direction in the part of these elements located at the top of the central third of the bipolar plate. This offset is, for example, about half of a pitch.

More specifically, the area ZD1 in which the elements are offset is the area in which, if two thin plates having the same channel layout were assembled together, the horizontal elements of the channels would coincide.

Thus, in the present invention, the assembly of a bipolar plate formed by a thin plate having a channel layout as shown in FIG. 1 and a thin plate having a channel layout as shown in FIG. 3 enables spaces to be provided at the position of the entry of the cooling liquid, such that the liquid can spread into the whole of the bipolar plate. These spaces are visible in FIG. 5, which shows a sectional view of the bipolar plate, the section being taken at the position of an offset. Thus it can be seen that the cooling liquid, penetrating between the bipolar plates through an opening 7, meets no obstacle on its passage towards the bottom of the bipolar plate, permitting a uniform distribution of the cooling liquid.

As mentioned above, the channel layouts are different on each of the two faces of the bipolar plate. Thus the offset of the channels as explained in the preceding paragraph may be provided on either the anode bipolar face or the cathode bipolar face.

In a preferred embodiment, however, the offset is provided on the anode face. This is because the channels provided in the thin plate forming the anode face of the bipolar plate are intended to carry hydrogen. Since hydrogen is a more fluid gas than oxygen, the offset formed in the channel has little or no adverse effect on the movement of the hydrogen flow in the fuel cell.

Additionally, in another preferred embodiment, a similar offset of the channels is provided in the bottom part of the bipolar plate, in an area ZD2. This offset in the bottom part is, for example, provided on the same face of the bipolar plate as the offset provided in the top part of the bipolar plate. This offset formed in the bottom part facilitates the discharge of the cooling liquid that has passed through the fuel cell.

Figure 4:
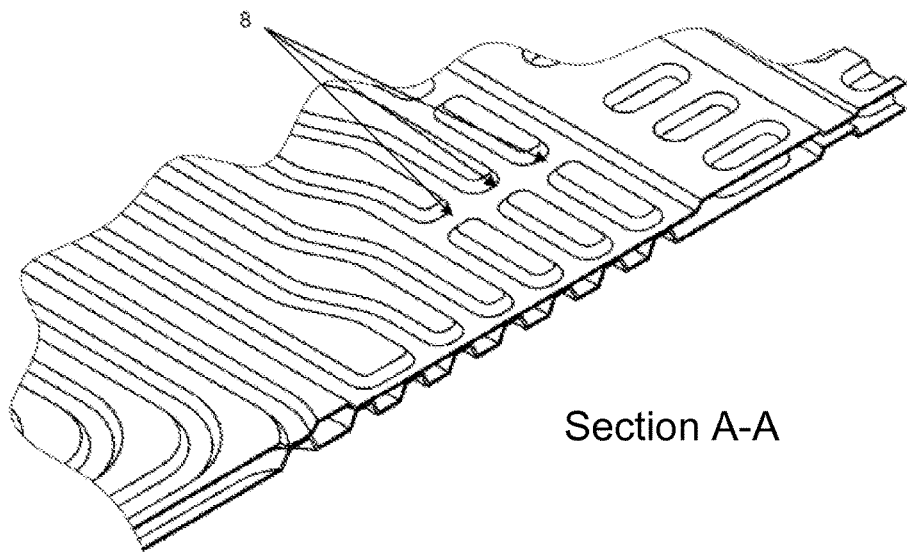
FIGS. 4 and 5 show two cross sections, taken along A-A and B-B respectively, through the bipolar plate shown in FIG. 3.
Figure 5:
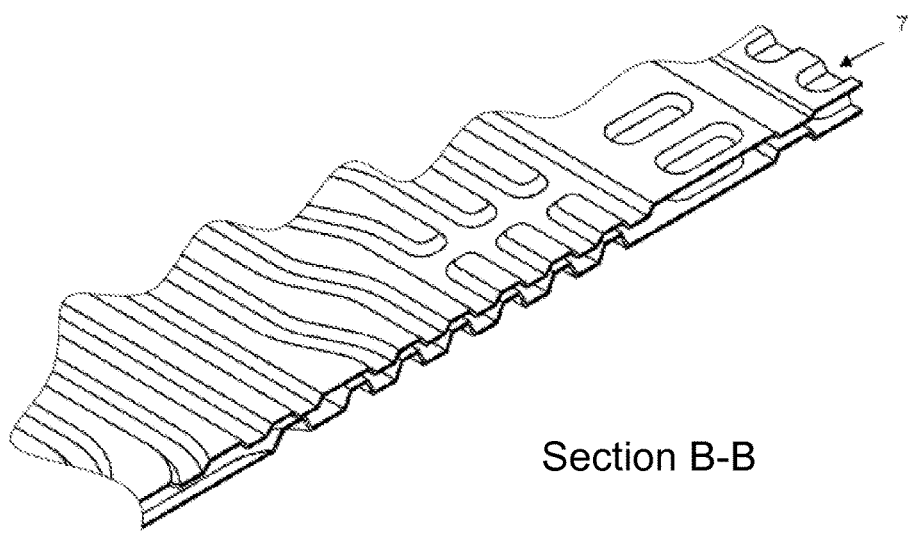

In another preferred embodiment, the channel elements having an offset also comprise fixing points 8. These fixing points can be used, as shown in FIG. 4, to stiffen the bipolar plate during the assembly of the two thin plates, and to ensure that the channel formed between the two bipolar plates, and shown in FIG. 5, is not flattened during assembly.

Thus the present invention makes it possible to improve the cooling of the fuel cell without affecting its efficiency, since the flows of hydrogen and oxygen gas required for the correct operation of the cell are not altered.

Figure 2:
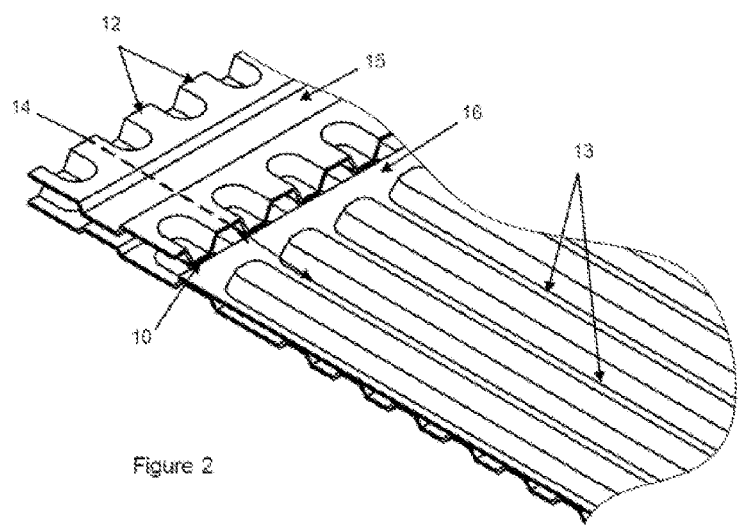
FIG. 2 shows a partial view, taken along a section line C-C, of the bipolar plate shown in FIG. 1.

In another aspect, the invention also relates to a bipolar plate comprising a device for supplying gas to the fuel cell. An exemplary embodiment of this plate is shown in FIGS. 1 and 2.

In one embodiment, the bipolar plate comprises a cut-out 10 formed in one face of the bipolar plate. This cut-out 10 is located between a manifold 4 for the supply of gas to the fuel cell and the channels formed on the faces of the bipolar plate. Thus the gas located in the manifold 4 penetrates between the two thin plates via the openings 12 and emerges from the space between the two plates through the cut-out 10, or supply aperture, so that it then flows into the supply channels 13 formed in the thickness of the thin plate in which the cut-out is made. This movement of the gas is illustrated by the arrow marked 14.

In an advantageous embodiment, the bipolar plate also includes a joint, made of polymer material for example, located in the area indicated by the arrow 15. A joint of the same type is positioned at the same location on the face of the bipolar plate intended to come into contact with the face shown in FIG. 1. Thus, at the time of stacking, these two joints provide a seal such that the gas flowing in the channels of the first plate does not come into contact with the gas flowing in the next bipolar plate in the stack, these two gases being different in nature, thereby enabling the fuel cell to operate correctly. To allow the passage of the gas illustrated by the arrow 14 under the bearing surface of the joint 15, the bearing surface of the joint 15 is raised above the other bearing areas of the joint where no passage of gas is required under the joint.

A joint 16 also makes it possible to provide a seal between the two thin plates forming the bipolar plate, so that the gas following the path indicated by the arrow 14 does not come into contact with the cooling liquid flowing in the bipolar plate.

This joint is, for example, formed by brazing, welding, adhesive bonding or any other means of forming a sealed connection.

In a preferred embodiment, the cut-out 10 and the two joints 15 and 16 extend along the whole length of the manifold 4, the term "length" being understood as extending over the whole horizontal part of the manifold in the sense of the present invention.

Advantageously, this device may be installed, mutatis mutandis, on both faces of the plate, provided that it is located at the position of the hydrogen supply manifold on the anode face, and at the position of the oxygen supply manifold on the cathode face.

Thus the device of the present invention, comprising, notably, a cut-out and one or more sealing joints, allows gas to be supplied to the fuel cell while providing a seal between the two gases, for example hydrogen and oxygen, flowing in the fuel cell. The device can also be used to form a seal between the cooling liquid and the gases.

The two aspects of the present invention, namely the offsetting of the channels to allow correct cooling of the bipolar plate, and the use of a cut-out for the gas supply, may be used in combination or independently of one another.

It should be noted that similar elements have been indicated in the figures by different references in order to clarify the arguments. Thus the channels indicated by the reference 13 in FIG. 2 form the set of channels indicated by the reference 5 in FIGS. 1 and 3. Additionally, the openings indicated by references 6, 7 and 12 are openings of the same kind.

Clearly, the invention is not limited to the examples described and illustrated, and various modifications can be made to it without departure from the scope of the invention as defined by the appended claims.

The invention claimed is:

1. A bipolar plate, which forms a first polar plate of a first base element of a fuel cell and a second polar plate of a second base element adjacent to the first base element of the fuel cell, the bipolar plate comprising:
    first and second parallel plates, each of the first and second parallel plates including distribution channels formed in a thickness thereof, each of the distribution channels being for distributing a fuel or an oxidant,
    wherein the distribution channels are arranged so that, when the first and second base elements of the fuel cell are stacked together, a flow channel is formed between the two first and second parallel plates, and the flow channel communicates with a cooling-fluid supply opening,
    wherein the distribution channels of the first parallel plate have a region with an arrangement in which adjacent channels are nested to remain adjacent to each other from an entry end, through a plurality of turns, to an exit end;
    wherein the distribution channels of the second parallel plate have a region with an arrangement in which adjacent channels are nested to remain adjacent to each other from an entry end, through a plurality of turns, to an exit end;
    wherein the first parallel plate has a first face and the second parallel plate has a second face,
    wherein, when the first face and the second face are mated to face each other, first and second areas are formed in the flow channel such that: (a) in the first area, an arrangement of horizontal elements forming part of the distribution channels of the first parallel plate is aligned to coincide with an arrangement of horizontal elements forming part of the distribution channels of the second parallel plate, the horizontal elements of the first and second parallel plates being elongated in a horizontal direction, and (b) in the second area, the arrangement of the horizontal elements forming part of the distribution channels of the first parallel plate has an offset from the arrangement of the horizontal elements forming part of the distribution channels of the second parallel plate, the offset being in a vertical direction that is perpendicular to the horizontal direction, the vertical direction corresponding to a flow direction from the cooling-fluid supply opening to a cooling-fluid exit opening, and (c) in the second area, the arrangement of the horizontal elements forming part of the distribution channels of the second parallel plate does not have an offset in the vertical direction from the arrangement of the horizontal elements forming part of the distribution channels of the second parallel plate in the first area, whereby the horizontal elements forming part of the distribution channels of the second parallel plate in the second area and the horizontal elements forming part of the distribution channels of the second parallel plate in the first area extend to one another in the horizontal direction without offset in the vertical direction,
    wherein the distribution channels of the first parallel plate include several adjacent distribution channels that (1) extend linearly in parallel in a first direction from a cut-out in the first parallel plate, the cut-out being located between a manifold for supplying a gas and the distribution channels, toward an end of the first parallel plate other than an end where the cut-out is located, (2) turn together to reverse direction so as to extend linearly in parallel in a second direction opposite to the first direction, and (3) turn together again to reverse direction so as to extend linearly in the first direction before terminating, and
    wherein the offset is formed on an anode face of the bipolar plate and not on a cathode face of the bipolar plate.

2. The bipolar plate according to claim 1, wherein the vertical direction is a direction from a first edge of the bipolar plate, the first edge being nearest to the cooling-fluid supply opening, to a second edge of the bipolar plate, the second edge being opposite the first edge.

3. The bipolar plate according to claim 1, wherein the offset has a value of ½ pitch, and
    wherein the second area is within a central third, in the horizontal direction, of the bipolar plate and not within the outer two-thirds, in the horizontal direction, of the bipolar plate.

4. The bipolar plate according to claim 2, wherein the offset has a value of at least ½ pitch.

5. The bipolar plate according to claim 1, wherein horizontal elements include fixing points.

6. The bipolar plate according to claim 2, wherein horizontal elements include fixing points.

7. The bipolar plate according to claim 3, wherein horizontal elements include fixing points.

8. The bipolar plate according to claim 4, wherein horizontal elements include fixing points.

9. The bipolar plate according to claim 1, wherein the distribution channels of each of the first and second parallel plates are nested in a square wave arrangement.

10. The bipolar plate according to claim 2, wherein each of the first and second parallel plates is structured to have first, second, and third sections arranged side-by-side in the horizontal direction, each of the sections of a given parallel plate having:
a common first end at one of the first edge and the second edge and
a common second end at the other of the first edge and the second edge,
in which:
in the first section, the distribution channels:
begin at the first end of the first section,
run towards the second end of the first section in the vertical direction, and
change direction at the second end of the first section such that they run in the horizontal direction and enter the second section,
in the second section, the distribution channels:
enter from the first section in the horizontal direction,
change direction to run in the vertical direction,
run towards the first end of the second section in the vertical direction, and
change direction at the first end of the second section such that they run in the horizontal direction and enter the third section, and
in the third section, the distribution channels:
enter from the second section in the horizontal direction,
change direction to run in the vertical direction,
run towards the second end of the third section in the vertical direction, and
terminate at the second end of the third section.

11. The bipolar plate according to claim 10, wherein the distribution channels in the second area are located in the second section of the first parallel plate.

12. The bipolar plate according to claim 11, wherein the first end of each of the first, second, and third sections of the first parallel plate corresponds to the second end of each of the first, second, and third sections of the second parallel plate.

13. The bipolar plate according to claim 2, wherein, when the first face and the second face are mated to face each other, a third area is formed in the flow channel such that, in the third area, an arrangement of the distribution channels of the first parallel plate has an offset from an arrangement of the distribution channels of the second parallel plate, and
wherein the third area is structured such that, during assembly of the bipolar plate, horizontal portions of the distribution channels in the first and second parallel plates are offset in the vertical direction.

14. The bipolar plate according to claim 13, wherein the second area is adjacent to the cooling-fluid supply opening, and the third area is adjacent to the cooling-fluid exit opening.

15. The bipolar plate according to claim 1, wherein the arrangement of distribution channels of the first and second parallel plates is the same except in the second area.

16. The bipolar plate according to claim 9, wherein horizontal elements include fixing points.

17. The bipolar plate according to claim 10, wherein horizontal elements include fixing points.

* * * * *

UNITED STATES PATENT AND TRADEMARK OFFICE
CERTIFICATE OF CORRECTION

PATENT NO. : 10,283,786 B2
APPLICATION NO. : 14/438352
DATED : May 7, 2019
INVENTOR(S) : David Olsommer Page 1 of 1

It is certified that error appears in the above-identified patent and that said Letters Patent is hereby corrected as shown below:

In the Claims

Column 5:
Line 63, "two" should be deleted.

Signed and Sealed this
Twenty-fourth Day of September, 2019

Andrei Iancu
*Director of the United States Patent and Trademark Office*